(12) United States Patent
Brita et al.

(10) Patent No.: US 9,200,094 B2
(45) Date of Patent: Dec. 1, 2015

(54) CATALYST COMPONENTS FOR THE POLYMERIZATION OF OLEFINS

(75) Inventors: Diego Brita, Ferrara (IT); Gianni Collina, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 208 days.

(21) Appl. No.: 12/224,008

(22) PCT Filed: Feb. 9, 2007

(86) PCT No.: PCT/EP2007/051252
§ 371 (c)(1),
(2), (4) Date: Aug. 14, 2008

(87) PCT Pub. No.: WO2007/096255
PCT Pub. Date: Aug. 30, 2007

(65) Prior Publication Data
US 2010/0168350 A1 Jul. 1, 2010

Related U.S. Application Data

(60) Provisional application No. 60/776,627, filed on Feb. 24, 2006.

(30) Foreign Application Priority Data

Feb. 21, 2006 (EP) .................... 06110213

(51) Int. Cl.
| | | |
|---|---|---|
| *B01J 31/00* | (2006.01) | |
| *B01J 37/00* | (2006.01) | |
| *C08F 4/02* | (2006.01) | |
| *C08F 4/60* | (2006.01) | |
| *C08F 2/00* | (2006.01) | |
| *C08F 4/44* | (2006.01) | |
| *C08F 10/00* | (2006.01) | |
| *C08F 210/16* | (2006.01) | |

(52) U.S. Cl.
CPC ............... *C08F 10/00* (2013.01); *C08F 210/16* (2013.01)

(58) Field of Classification Search
CPC ............ C08F 2/00; C08F 4/44; C08F 110/02; C08F 4/02; C08F 4/60; B01J 31/00; B01J 37/00
USPC ................ 526/123.1, 209; 502/126, 156, 172
See application file for complete search history.

(56) References Cited

U.S. PATENT DOCUMENTS

| | | | |
|---|---|---|---|
| 4,399,054 A * | 8/1983 | Ferraris et al. ................ 502/125 |
| 4,469,648 A | 9/1984 | Ferraris et al. | |
| 4,673,719 A * | 6/1987 | Kioka et al. ............... 526/124.9 |
| 4,829,034 A | 5/1989 | Iiskolan et al. | |
| 5,055,535 A | 10/1991 | Spitz et al. | |
| 5,100,849 A | 3/1992 | Miya et al. | |
| 5,266,666 A * | 11/1993 | Kamiishi et al. ........... 526/125.3 |
| 6,127,304 A | 10/2000 | Sacchetti et al. | |
| 6,323,152 B1 | 11/2001 | Sacchetti et al. | |
| 6,407,028 B1 | 6/2002 | Sacchetti et al. | |
| 6,437,061 B1 | 8/2002 | Sacchetti et al. | |
| 6,686,307 B2 | 2/2004 | Sacchetti et al. | |
| 7,208,436 B2 | 4/2007 | Dall'Occo et al. | |
| 2005/0176900 A1* | 8/2005 | Zhu et al. .................. 526/124.3 |

FOREIGN PATENT DOCUMENTS

| | | |
|---|---|---|
| EP | 373999 | 6/1990 |
| EP | 564211 | 10/1993 |
| JP | 2003-321511 | 11/2003 |
| WO | 98/44009 | 10/1998 |
| WO | 03/106511 | 12/2003 |
| WO | 2006/094897 | 9/2006 |

* cited by examiner

*Primary Examiner* — Elizabeth Eng

(57) ABSTRACT

The present invention relates to catalysts component for the polymerization of ethylene and its mixtures with olefins $CH_2=CHR$, wherein R is an alkyl, cycloalkyl or aryl radical having 1-12 carbon atoms, comprising Ti, Mg, halogen, and electron donor belonging to 1,2-diethers as internal electron donor compound. The catalyst of the invention is suitably used in (co)polymerization processes of ethylene to prepare (co)polymers having narrow Molecular Weight Distribution (MWD) and high bulk density.

12 Claims, No Drawings

CATALYST COMPONENTS FOR THE POLYMERIZATION OF OLEFINS

The present invention relates to catalyst components for the polymerization of ethylene and its mixtures with olefins $CH_2=CHR$, wherein R is an alkyl, cycloalkyl or aryl radical having 1-12 carbon atoms, comprising Ti, Mg, halogen, and a particular electron donor compound. The catalyst component of the invention is suitably used in (co)polymerization processes of ethylene to prepare (co)polymers having narrow Molecular Weight Distribution (MWD), high bulk density and wide range of average particle size. The MWD is an important characteristic of ethylene polymers in that it affects their rheological behavior, their processability, and their final mechanical properties. In particular, polymers with narrow MWD are suitable for films and injection molding in that deformation and shrinkage problems in the manufactured article are minimized. The width of the molecular weight distribution for the ethylene polymers is generally expressed as melt flow ratio F/E, which is the ratio between the melt index measured by a load of 21.6 Kg (melt index F) and that measured with a load of 2.16 Kg (melt index E). The measurements of melt index are carried out according to ASTM D-1238 and at 190° C. Catalysts for preparing ethylene (co) polymers having narrow MWD are described in the European patent application EP-A-373999. The catalyst comprises a solid catalyst component consisting of a titanium compound supported on magnesium chloride, an alkyl-Al compound and an electron donor compound (external donor) selected from monoethers of the formula R'OR". Good results in terms of narrow MWD are only obtained when the solid component also contains an internal electron donor compound (diisobutylphthalate). The catalyst activity is rather low and, in addition, the cited document does not disclose or teach anything about the polymer bulk density provided by the catalyst. This latter characteristic is very important in the operation of the plants because it assures smooth polymer flow and high productivity. Hence, it would be highly desirable to have a catalyst capable to produce polymers in high yields with narrow molecular weight distribution and high bulk density.

Moreover, it would be also desirable that the catalyst component be able to produce polymers having a variable and flexible range of average particle size in order to broaden the range of applicability and making possible their use also in gas-phase polymerization technology.

JP 2003-321511 discloses polymerization of ethylene in the presence of a catalyst the preparation of which includes the use of Mg metal, oxygenated compounds, among which 1,2-dimethoxypropane, a titanium compound to form a gel-like solution from which a solid is precipitated by the aid of a chlorinating agent. Although polymers with narrow MWD and high bulk density are obtained, the average particle size of the polymer is not large enough to allow the use in gas-phase polymerization.

The applicant has now found catalyst components in substantially spherical form capable of satisfying the above-mentioned needs that comprise Mg, Ti, and halogen as essential elements and containing an electron donor compound of formula (I)

$$R_aCR_1(OR_4)—CR_2R_3(OR_5) \quad (I)$$

in which $R_a$ is a methyl group or hydrogen or is condensed with $R_4$ to form a cycle, $R_1$, $R_2$ and $R_3$ are, independently, hydrogen or C1-C20 hydrocarbon groups, possibly containing heteroatoms, $R_4$ and $R_5$ are C1-C20 alkyl groups, or $R_6CO—$ groups where $R_6$ is a C1-C20 alkyl group, or they can be joined with R and $R_3$ respectively to form a cycle; with the provisos that when $R_a$ is hydrogen $R_4$ and $R_5$ are not simultaneously methyl and when $R_a$ and $R_4$ form a cycle $R_5$ is C1-C20 alkyl group.

Preferably, in the electron donor compound of formula (I), $R_a$ is methyl.

Preferably, in the electron donor compound of formula (I) $R_1$ to $R_3$ are hydrogen. When $R_4$ and $R_5$ are alkyl groups they are preferably chosen among C1-C5 alkyl groups and more preferably among methyl or ethyl. Preferably they are both methyl. Among $R_6CO$ groups preferred is acetyl.

Specific electron donor compounds of formula (I) are ethylene glycol diacetate, 1,2-dimethoxypropane, 1,2-diethoxypropane, methyl tetrahydrofurfuryl ether.1,2-dimethoxypropane being the most preferred.

The term substantially in spherical form means particles in which the ratio among the longer axis and the shorter axis is equal to, or lower than, 1.5 and preferably lower than 1.3. Such values can be measure via known methods such as optical or electronic microscopy.

Particularly preferred are the solid catalyst components in which the Ti atoms derive from a titanium compound which contains at least one Ti-halogen bond and the Mg atoms derive from magnesium chloride. In a still more preferred aspect both the titanium compound and the electron donor of formula (I) are supported on magnesium dichloride. Preferably, in the catalyst of the present invention at least 70% of the titanium atoms and more preferably at least 90% of them, are in the +4 valence state.

In a particular embodiment, the magnesium dichloride is in active form. The active form of magnesium dichloride present in the catalyst components of the invention is recognizable by the fact that in the X-ray spectrum of the catalyst component the major intensity reflection which appears in the spectrum of the non-activated magnesium dichloride (having usually surface area smaller than 3 m²/g) is no longer present, but in its place there is a halo with the position of the maximum intensity shifted with respect to the position of the major intensity reflection, or by the fact that the major intensity reflection presents a half-peak breadth at least 30% greater that the one of the corresponding reflection of the non-activated Mg dichloride. The most active forms are those in which the halo appears in the X-ray spectrum of the solid catalyst component.

In the case of the most active forms of magnesium dichloride, the halo appears in place of the reflection which in the spectrum of the non-activated magnesium chloride is situated at the interplanar distance of 2.56 Å.

Preferred titanium compounds are the halides or the compounds of formula $TiX_n(OR^7)_{4-n}$, where $1 \leq n \leq 3$, X is halogen, preferably chlorine, and $R^7$ is $C_1$-$C_{10}$ hydrocarbon group. Especially preferred titanium compounds are titanium tetrachloride and the compounds of formula $TiCl_3OR^7$ where $R^7$ has the meaning given above and in particular selected from methyl, n-butyl or isopropyl.

One preferred way to prepare the substantially spherical catalyst components is by reacting the titanium compound having at least a Ti-halogen bond with an adduct of formula a $MgCl_2 \cdot nROH$ adduct in the form of substantially spherical particles, where n is generally from 1 to 6, and ROH is an alcohol in the presence of the electron donor of formula (I).

In particular, the $MgCl_2 \cdot nROH$ is caused to react with an excess of liquid $TiCl_4$ containing electron donor of formula (I) in the optional presence of hydrocarbon solvents. The reaction temperature initially is from 0° to 25° C., and is then increased to 80-135° C. Then, the solid may be reacted once more with $TiCl_4$, separated and washed with a liquid hydrocarbon until no chlorine ions can be detected in the wash liquid. The electron donor compound of formula (I) is preferably added together with the titanium compound to the reaction system. However, it can also be first contacted with the adduct alone and then the so formed product reacted with the titanium compound. As an alternative method, the electron donor compound can be added after the completion of the reaction between the adduct and the titanium compound.

The $MgCl_2 \cdot nROH$ adduct can be prepared in spherical form from melted adducts, by emulsifying the adducts in a liquid hydrocarbon and thereafter causing them to solidify by fast quenching. Representative methods for the preparation of these spherical adducts are reported for example in U.S. Pat. No. 4,469,648, U.S. Pat. No. 4,399,054, and WO98/44009. Another useable method for the spherulization is the spray cooling described for example in U.S. Pat. Nos. 5,100,849 and 4,829,034.

In a preferred aspect of the present invention, before being reacted with the titanium compound, the spherulized adducts are subjected to thermal dealcoholation at a temperature ranging from 50 and 150° C. until the alcohol content is reduced to values lower than 2 and preferably ranging from 0.3 and 1.5 mols per mol of magnesium chloride.

Optionally, said dealcoholated adducts can be finally treated with chemical reagents capable of reacting with the OH groups of the alcohol and of further dealcoholating the adduct until the content is reduced to values which are generally lower than 0.5 mols.

The $MgCl_2$/electron donor of formula (I) molar ratio used in the reactions indicated above preferably ranges from 7:1 to 40:1, preferably from 8:1 to 35:1.

The particle size of the catalyst components obtained with this method is easily controllable and can vary over a broad range for example from 1 to 150 μm. This allows the preparation of both components with a small average particle size (in the range of 5-20 μm) useful for slurry polymerization and components with a medium large particle size (over 30 μm) particularly suitable for gas-phase polymerization. Also the particle size distribution is narrow being the SPAN of the catalyst particles comprised between 0.7 and 1.3 preferably from 0.8 to 1.2. The SPAN being defined as the value of the ratio $$\frac{P90 - P10}{P50},$$

wherein P90 is the value of the diameter such that 90% of the total volume of particles have a diameter lower than that value; P10 is the value of the diameter such that 10% of the total volume of particles have a diameter lower than that value and P50 is the value of the diameter such that 50% of the total volume of particles have a diameter lower than that value. In particular, with the catalyst of the invention it is possible to produce polymers with average particle size over 350 μm, particularly over 500 μm which would be suitable for gas-phase polymerization and are not obtained in JP 2003-321511. Moreover, the said polymers are also endowed with a narrow molecular weight distribution (F/E ratio lower than 30) and a high bulk density (typically over 0.3 g/cm³).

The solid catalyst components according to the present invention are converted into catalysts for the polymerization of olefins by reacting them with organoaluminum compounds according to known methods.

In particular, it is an object of the present invention a catalyst for the polymerization of olefins $CH_2$=CHR, in which R is hydrogen or a hydrocarbyl radical with 1-12 carbon atoms, comprising the product of the reaction between:

(a) a solid catalyst component as described above,
(b) an alkylaluminum compound and, optionally,
(c) an external electron donor compound.

The alkyl-Al compound can be preferably selected from the trialkyl aluminum compounds such as for example trimethylaluminum (TMA), triethylaluminum (TEAL), triisobutylaluminum (TIBA)), tri-n-butylaluminum, tri-n-hexylaluminum, tri-n-octylaluminum. Also alkylaluminum halides and in particular alkylaluminum chlorides such as diethylaluminum chloride (DEAC), diisobutylalumunum chloride, Al-sesquichloride and dimethylaluminum chloride (DMAC) can be used. It is also possible to use, and in certain cases preferred, mixtures of trialkylaluminum's with alkylaluminum halides. Among them mixtures between TEAL and DEAC are particularly preferred. The use of TEAL and TIBA, alone or in mixture is also preferred. Particularly preferred is also the use of TMA.

The external electron donor compound can be selected from the group consisting of ethers, esters, amines, ketones, nitriles, silanes and mixtures of the above. In particular, it can advantageously be selected from the C2-C20 aliphatic ethers and in particulars cyclic ethers preferably having 3-5 carbon atoms cyclic ethers such as tetrahydrofurane, dioxane.

In addition, the electron donor compound can also be advantageously selected from silicon compounds of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane.

The above mentioned components (a)-(c) can be fed separately into the reactor where, under the polymerization conditions can exploit their activity. It may be advantageous the pre-contact of the above components, optionally in the presence of small amounts of olefins, for a period of time ranging from 0.1 to 120 minutes preferably in the range from 1 to 60 minutes. The pre-contact can be carried out in a liquid diluent at a temperature ranging from 0 to 90° C. preferably in the range of 20 to 70° C.

The catalyst system disclosed above can be used directly in the main polymerization process or alternatively, it can be pre-polymerized beforehand. A pre-polymerization step is usually preferred when the main polymerization process is carried out in the gas phase. The prepolymerization can be carried out with any of the olefins $CH_2$=CHR, where R is H or a C1-C10 hydrocarbon group. In particular, it is especially preferred to pre-polymerize ethylene, propylene or mixtures thereof with one or more α-olefins, said mixtures containing up to 20% in moles of α-olefin, forming amounts of polymer from about 0.1 g per gram of solid component up to about 1000 g per gram of solid catalyst component. The pre-polymerization step can be carried out at temperatures from 0 to 80° C., preferably from 5 to 70° C., in the liquid or gas phase. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly preferred. The pre-polymerized catalyst component can also be subject to a further treatment with a titanium compound before being used in the main polymerization step. In this case the use of TiCl$_4$ is particularly preferred. The reaction with the Ti compound can be carried out by suspending the prepolymerized catalyst component in the liquid Ti compound optionally in mixture with a liquid diluent; the mixture is heated to 60-120° C. and kept at this temperature for 0.5-2 hours.

The catalysts of the invention can be used in any kind of polymerization process both in liquid and gas-phase processes. Catalysts in which the solid catalyst component has small average particle size, such as less than 30 μm, preferably ranging from 5 to 20 μm, are particularly suited for slurry polymerization in an inert medium, which can be carried out continuously stirred tank reactor or in loop reactors. In a preferred embodiment the solid catalyst components having small average particle size as described are particularly suited for the use in two or more cascade loop or stirred tank reactors producing polymers with different molecular weight and/or different composition in each reactor. Catalysts in which the solid catalyst component has medium/large average particle size such as at least 30 μm and preferably ranging from 50 to 100 μm are particularly suited for gas-phase polymerization processes which can be carried out in agitated or fluidized bed gas-phase reactors. Also in this case use of the catalyst in plant set-up comprising two or more cascade reactors working under different conditions to prepare polymers with different molecular weight and/or composition is particularly preferred.

As already mentioned, the catalysts of the present invention are particularly suitable for preparing ethylene polymers having narrow molecular weight distribution that are characterized by a F/E ratio of lower than 30 in combination with a high bulk density. When ethylene is polymerized together with a minor amount of an alpha-olefin as comonomer, selected from propylene, buetene-1, hexene-1 and octene-1, a linear low density polyethylene having a density lower than 0.940 g/cm$^3$ is obtained with a very good quality which is indicated by the low ratio (lower than 1.4) among weight of xilene soluble fraction and weight percentage of comonomer in the chain. In addition, the catalysts of the invention also show the capability of producing polymers with a high bulk density, typically over 0.3 g/cm$^3$ and high activity, generally higher than 30 Kg/g cat.

In addition, to the ethylene homo and copolymers mentioned above the catalysts of the present invention are also suitable for preparing very-low-density and ultra-low-density polyethylenes (VLDPE and ULDPE, having a density lower than 0.920 g/cm$^3$, to 0.880 g/cm$^3$) consisting of copolymers of ethylene with one or more alpha-olefins having from 3 to 12 carbon atoms, having a mole content of units derived from ethylene of higher than 80%; elastomeric copolymers of ethylene and propylene and elastomeric terpolymers of ethylene and propylene with smaller proportions of a diene having a content by weight of units derived from ethylene of between about 30 and 70%.

The following examples are given in order to further describe the present invention in a non-limiting manner.

Characterization

The properties are determined according to the following methods:
Melt Index:
Melt index (M.I.) are measured at 190° C. following ASTM D-1238 over a load of:
  2.16 Kg, MI E=MI$_{2.16}$.
  21.6 Kg, MI F=MI$_{21.6}$.

The ratio: F/E=MI F/MI E=MI$_{21.6}$/MI$_{2.16}$ is then defined as melt flow ratio (MFR)

Fraction soluble in xylene. The solubility in xylene at 25° C. was determined according to the following method: About 2.5 g of polymer and 250 mL of o-xylene were placed in a round-bottomed flask provided with cooler and a reflux condenser and kept under nitrogen. The mixture obtained was heated to 135° C. and was kept under stirring for about 60 minutes. The final solution was allowed to cool to 25° C. under continuous stirring, and was then filtered. The filtrate was then evaporated in a nitrogen flow at 140° C. to reach a constant weight. The content of said xylene-soluble fraction is expressed as a percentage of the original 2.5 grams.

Comonomer Content

1-Butene was determined via Infrared Spectrometry.

The α-olefins higher than 1-butene were determined via Infra-Red analysis.

Effective density: ASTM-D 1505

General Procedure for the HDPE Polymerization Test

Into a 4.5 liters stainless steel autoclave, degassed under N$_2$ stream at 70° C., 1.6 liters of anhydrous hexane, the reported amount of catalyst component and 0.5 g of triethylaluminum (TEAL) were introduced (or 0.87 g of TIBA). The whole was stirred, heated to 75° C. and thereafter 4 bar of H$_2$ and 7 bar of ethylene were fed. The polymerization lasted 2 hours during which ethylene was fed to keep the pressure constant. At the end, the reactor was depressurized and the polymer recovered was dried under vacuum at 60° C.

General Procedure for the LLDPE Polymerization Test

A 4.0 L stainless-steel autoclave equipped with a helical magnetic stirrer, temperature and pressure indicator, feed line for ethylene, propane, hydrogen, 1-butene and a steel vial for the injection of the catalyst was used and purified by flushing ethylene at 80° C. and washing with propane. In the following order, 1.2 g of TIBA (or 0.69 g of TEAL) and 12 mg of the solid catalyst matured for 5 minutes and introduced in the empty reactor in a stream of propane. The autoclave was then closed and 1.6 l of propane were introduced, after which the temperature was raised to 75° C. (10 minutes) with simultaneous introduction of ethylene up to 7 bar of partial pressure and 1-butene in the amount reported in table. At the end, 1.5 bar of hydrogen (partial pressure) were added. Under continuous stirring, the total pressure was maintained at 75° C. for 120 minutes by feeding ethylene (if the ethylene consumption reaches 200 g, the test is stopped before the two hours). At the end the reactor was depressurised and the temperature was dropped to 30° C. The recovered polymer was dried at 60° C. under a nitrogen flow and weighted.

Example 1

Preparation of the Spherical MgCl$_2$-EtOH Adduct

A magnesium chloride and alcohol adduct containing about 3 mols of alcohol having spherical form and average size of about 12 μm was prepared following the method described in example 2 of U.S. Pat. No. 4,399,054.

Preparation of the Solid Component

The spherical support, prepared according to the general method underwent a thermal treatment, under N$_2$ stream, over a temperature range of 50-150° C. until spherical particles having a residual ethanol content of about 35% (1.1 mole of ethanol for each MgCl$_2$ mole) were obtained.

Into a 2 l glass reactor provided with stirrer, were introduced 1 L of TiCl4, 70 g of the support prepared as described above and, at temperature of 0° C., 3.6 ml of 1,2-diemthoxypropane (1,2DMP) (Mg/DMP=16 mol/mol). The whole mixture was heated and kept under stirring for 60 minutes at 100° C. After that, stirring was discontinued and the liquid siphoned off. Two washings with fresh hexane (1 liter) were performed at 60° C. and then, other two more hexane washings were performed at room temperature. The spherical solid component was discharged and dried under vacuum at about 50° C.

The composition of the solid was the following:

| | |
|---|---|
| Total titanium | 4.1% (by weight) |
| Mg | 17.7% (by weight) |
| Cl | 62.4% (by weight) |
| 1,2-DMP | 0.8% (by weight) |

The so prepared catalyst has then been used in the polymerization of ethylene according to the general polymerization procedure (first run with TEAL second run with TIBAL). The results are shown in Table 1.

Moreover, the catalyst was also used in the preparation of LLDPE according to the general procedure and the results shown in Table 2 have been obtained.

Example 2

The catalyst was prepared according to the procedure disclosed in Example 1 with the difference that methyl tetrahydrofurfuryl ether was used instead of 1,2DMP. The composition of the solid was the following:

| | |
|---|---|
| Total titanium | 4.3% (by weight) |
| Mg | 17.5% (by weight) |
| Cl | 61.6% (by weight) |
| methyl tetrahydrofurfuryl ether | 1.2% (by weight) |

The so prepared catalyst has then been used in the polymerization of ethylene according to the general polymerization procedure (first run with TEAL second run with TIBAL). The results are shown in Table 1.

Example 3

The catalyst was prepared according to the procedure disclosed in Example 1 with the difference that 1,2-diethoxypropane (1,2-DEP) in an amount such the Mg/1,2-DEP is 8 is used. The composition of the solid was the following:

| | |
|---|---|
| Total titanium | 4.1% (by weight) |
| Mg | 17.7% (by weight) |
| Cl | 62.4% (by weight) |
| 1,2-DEP | 0.8% (by weight) |

The so prepared catalyst has then been used in the polymerization of ethylene according to the general polymerization procedure (with TIBAL). The results are shown in Table 1. Moreover, the catalyst was also used in the preparation of LLDPE according to the general procedure and the results shown in Table 2 have been obtained.

Example 4

The catalyst was prepared according to the procedure disclosed in Example 1 with the difference that treatment in TiCl$_4$ was carried out for 120 minutes and the solid phase settled in 120 minutes while keeping constant the temperature of liquid phase.

| | |
|---|---|
| Total titanium | 5.7% (by weight) |
| Mg | 17.5% (by weight) |
| Cl | 62.0% (by weight) |
| 1,2-DMP | 0.7% (by weight) |

The so prepared catalyst has then been used in the polymerization of ethylene according to the general polymerization procedure (first run with TEAL second run with TIBAL). The results are shown in Table 1.

Example 5

The catalyst was prepared according to the procedure disclosed in Example 1 with the difference that the settling time of the solid phase was 180 minutes with temperature of the liquid phase being at 50° C.

| | |
|---|---|
| Total titanium | 5.4% (by weight) |
| Mg | 17.3% (by weight) |
| Cl | 62.9% (by weight) |
| 1,2-DMP | 0.9% (by weight) |

The so prepared catalyst has then been used in the polymerization of ethylene according to the general polymerization procedure (first run with TEAL second run with TIBAL). The results are shown in Table 1.

Example 6

The catalyst was prepared according to the procedure disclosed in Example 1 with the difference that 1.2 DMP was introduced into the reactor in order to get Mg/1.2DMP=8 mol/mol.

| | |
|---|---|
| Total titanium | 4.8% (by weight) |
| Mg | 16.9% (by weight) |
| Cl | 60.4% (by weight) |
| 1,2-DMP | 1.4% (by weight) |

The so prepared catalyst has then been used in the polymerization of ethylene according to the general polymerization procedure (first run with TEAL second run with TIBAL). The results are shown in Table 1.

Example 7

Into a 2 l glass reactor provided with stirrer, were introduced 1 L of TiCl$_4$ and 70 g of the support prepared as described in the example 1. The whole mixture was heated and kept under stirring for 30 minutes at 75° C. After that, stirring was discontinued and the liquid siphoned off. At room temperature, 1 of fresh TiCl$_4$ was introduced and immediately, 7.2 mL of 1,2 DMP (Mg/1,2DMP=8 mol/mol) were added stirring the slurry. Then, the mixture was heated at 100° C. and kept under stirring for 60 minutes. After that, stirring was discontinued and the slurry settled for 180 minutes. Then the liquid was siphoned off.

Two washings with fresh hexane (1 liter) were carried out at 60° C. and then two additional hexane washings were performed at room temperature. The spherical solid component was discharged and dried under vacuum at about 50° C.

The composition of the solid was the following:

| | | |
|---|---|---|
| Total titanium | 4.0% | (by weight) |
| Mg | 18.4% | (by weight) |
| Cl | 63.1% | (by weight) |
| 1,2-DMP | 2.8% | (by weight) |

The so prepared catalyst has then been used in the polymerization of ethylene according to the general polymerization procedure (first run with TEAL second run with TIBAL). The results are shown in Table 1.

Comparison Example 1

A catalyst component was prepared according to the same procedure described in Example 1 with the only difference that the electron donor compound of formula (I) was not used.

The said catalyst has then been used in the polymerization of ethylene according to the general polymerization procedure (first run with TEAL second run with TIBAL). The results are shown in Table 1.

TABLE 1

| EX. | Mileage (KgPE/gctz) | MIE (g/10') | F/E | APS μm | B.D.P. g/cc | $AlR_3$ |
|---|---|---|---|---|---|---|
| 1 | 33.9 | 0.56 | 27.5 | 581 | 0.367 | TEAL |
|   | 32 | 0.6 | 28 | 547 | 0.28 | TIBAL |
| 2 | 32 | 0.5 | 27 | 498 | 0.348 | TEAL |
|   | 34 | 0.39 | 29 | 508 | 0.30 | TIBAL |
| 3 | 32 | 0.39 | 30.1 | 453 | 0.394 | TEAL |
|   | 32 | 1.1 | 29.7 | 485 | 0.281 | TIBAL |
| 4 | 41 | 0.5 | 27.4 | 475 | 0.318 | TEAL |
|   | 43 | 0.31 | 28.7 | 518 | 0.271 | TIBAL |
| 5 | 48 | 1 | 27 | 393 | 0.369 | TEAL |
|   | 40 | 0.41 | 26.6 | 602 | 0.300 | TIBAL |
| 6 | 27.9 | 0.3 | 23.6 | 473 | 0.350 | TEAL |
|   | 12.5 | 0.13 | 26.1 | 364 | 0.332 | TIBAL |
| 7 | 25.1 | 0.63 | 26.5 | 369 | 0.398 | TEAL |
|   | 28 | 0.21 | 28.7 | 566 | 0.288 | TIBAL |
| Comp 1 | 40.3 | 1.2 | 36.1 | 447 | 0.354 | TEAL |
|   | 25.9 | 0.24 | 44.2 | 522 | 0.229 | TIBAL |

TABLE 2

| | $C4^-$ feed G | Mileage Kg/gcat | MIE g/10' | C4− bonded Wt % | Density g/cc | Xyl. Sol. Wt % |
|---|---|---|---|---|---|---|
| Ex 1 | 100 | 22 | 0.4 | 9.5 | 0.916 | 11.8 |
| Ex. 3 | 100 | 19.4 | 1.5 | 9.5 | 0.9203 | 9.8 |

The invention claimed is:

1. A catalyst for polymerizing olefins, comprising the reaction product of a spherical catalyst component and an alkylaluminum compound, wherein the spherical catalyst component comprises Mg, Ti, halogen, and an electron donor compound of formula (I):

$$R_aCR_1(OR_4)—CR_2R_3(OR_5) \quad (I)$$

wherein
$R_a$ is methyl or is condensed with $R_4$ to form a cycle;
$R_1$, $R_2$ and $R_3$ are, independently, hydrogen or $C_1$-$C_{20}$ hydrocarbon groups optionally comprising heteroatoms; and
$R_4$ and $R_5$ are, independently, methyl or can be joined with $R_1$ and $R_3$ respectively to form a cycle;
wherein the Ti atoms are from a titanium compound comprising at least one Ti-halogen bond, and the Mg atoms are from magnesium chloride.

2. A process which comprises polymerizing olefins of formula $CH_2$=CHR', wherein R' is hydrogen or a hydrocarbyl radical comprising 1-12 carbon atoms, in presence of the catalyst of claim 1.

3. The process of claim 2 wherein the electron donor is selected from 1,2-dimethoxypropane or methyl tetrahydrofurfuryl ether.

4. The process of claim 2 wherein the polymerized olefin has an F/E ratio of lower than 30.

5. The process of claim 2 wherein the polymerized olefin is a linear low density polyethylene having an F/E ratio of lower than 30 and a density lower than 0.940 g/cm³.

6. The process of claim 2 wherein the polymerized olefin is a very low density polyethylene or an ultra low density polyethylene having an F/E ratio of lower than 30 and a density from 0.880 to lower than 0.920 g/cm³.

7. A substantially spherical catalyst component for polymerizing olefins, comprising Mg, Ti, halogen, and an electron donor compound of formula (I)

$$R_aCR_1(OR_4)—CR_2R_3(OR_5) \quad (I)$$

wherein $R_a$ is methyl or is condensed with $R_4$ to form a cycle; $R_1$, $R_2$ and $R_3$ are, independently, hydrogen or $C_1$-$C_{20}$ hydrocarbon groups; $R_4$ and $R_5$ are, independently methyl or can be joined with $R_1$ and $R_3$ respectively to form a cycle; and wherein the Ti atoms are from a titanium compound comprising at least one Ti-halogen bond and the Mg atoms are from magnesium chloride, said electron donor being used in the catalyst component preparation in amounts such as to have a $M_gCl_2$/donor molar ratio ranging from 8:1 to 35:1.

8. The catalyst components of claim 1, wherein $R_1$, $R_2$, and $R_3$ are hydrogen.

9. The catalyst components of claim 1, wherein $R_4$ and $R_5$ are methyl.

10. The catalyst components of claim 1, wherein the electron donor of formula (I) is selected from the group consisting of 1,2-dimethoxypropane and methyl tetrahydrofurfuryl ether.

11. The catalyst components of claim 1 obtained by reacting a titanium compound comprising at least one Ti-halogen bond with substantially spherical particles of an adduct of formula $MgCl_2 \cdot nROH$, in presence of the electron donor compound, wherein n is from 1 to 6, and R is an alkyl, cycloalkyl or aryl radical comprising 1-12 carbon atoms.

12. The catalyst components of claim 1 wherein $R_a$ is methyl.

* * * * *